United States Patent
Neuwirth et al.

(10) Patent No.: US 9,533,793 B2
(45) Date of Patent: Jan. 3, 2017

(54) TRANSFER PICK

(71) Applicant: UNEX Manufacturing, Inc., Jackson, NJ (US)

(72) Inventors: Brian F. Neuwirth, Brielle, NJ (US); Thomas Kimball, Toms River, NJ (US); Howard McIlvaine, IV, Freehold, NJ (US); David Scelfo, Asbury Park, NJ (US); Charles F. Doty, Visalia, CA (US)

(73) Assignee: Unex Manufacturing, Inc., Jackson, NJ (US)

(*) Notice: Subject to any disclaimer, the term of this patent is extended or adjusted under 35 U.S.C. 154(b) by 0 days.

(21) Appl. No.: 13/946,604

(22) Filed: Jul. 19, 2013

(65) Prior Publication Data

US 2014/0023476 A1 Jan. 23, 2014

Related U.S. Application Data

(60) Provisional application No. 61/673,826, filed on Jul. 20, 2012.

(51) Int. Cl.
*B65D 19/00* (2006.01)
*B65D 19/38* (2006.01)
(Continued)

(52) U.S. Cl.
CPC .......... *B65D 19/38* (2013.01); *B65D 19/0055* (2013.01); *B65D 2519/00805* (2013.01);
(Continued)

(58) Field of Classification Search
CPC ....... B65G 1/026; B65G 13/00; B65G 1/0435; B65G 1/06; A47B 45/00; A47B 96/025; A47F 5/0093; A47F 10/04; B60P 1/00; B60P 1/003; B60P 1/64; B65D 19/38; B65D 2519/00273; B65D 2519/00288
(Continued)

(56) References Cited

U.S. PATENT DOCUMENTS 2,909,350 A * 10/1959 Morris ............... B65D 19/0097
108/54.1
2,942,827 A * 6/1960 Edson ................ B65D 19/0028
108/54.1

(Continued)

FOREIGN PATENT DOCUMENTS

AU WO 2011014917 A1 * 2/2011 .......... B65D 88/129

*Primary Examiner* — Gregory Adams
(74) *Attorney, Agent, or Firm* — Hoffmann & Baron, LLP

(57) ABSTRACT

An apparatus includes a platform positioned on the pallet, the platform having a load bearing surface including a first portion and a second portion. The second portion is movable relative to the first, such that the second portion overlies the first portion. A method of unloading articles from a pallet including arranging the loaded pallet with the second portion of the platform in the second position, unloading articles from the first portion of the platform, shifting the second portion of the platform to the second position, and unloading articles from the second portion of the platform. A method of loading articles on a pallet, including arranging the pallet with the second portion of the platform in the second position, loading articles onto the second portion of the platform, shifting the second portion of the platform to the first position, and loading articles onto the first portion of the platform.

13 Claims, 17 Drawing Sheets

(51) Int. Cl.
*B65G 65/00* (2006.01)
*B65G 1/02* (2006.01)

(52) U.S. Cl.
CPC .... *B65D 2519/00815* (2013.01); *B65G 1/026* (2013.01); *B65G 65/00* (2013.01)

(58) Field of Classification Search
USPC ........... 104/135; 105/157.1; 108/51.11, 54.1, 108/57.15, 59, 93; 193/38, 41; 211/126.15, 151, 211/164, 59.2; 248/346.02, 346.03, 346.07, 248/346.3, 694; 312/334.13, 350; 410/67; 414/286
See application file for complete search history.

(56) References Cited

U.S. PATENT DOCUMENTS

| | | | | |
|---|---|---|---|---|
| 3,010,409 | A * | 11/1961 | De Good Maynard et al. | 104/135 |
| 3,561,620 | A * | 2/1971 | Willis | B66F 9/141 414/282 |
| 4,136,783 | A * | 1/1979 | Karashima | 211/59.2 |
| 4,500,146 | A * | 2/1985 | Peterson | 312/257.1 |
| 4,950,123 | A * | 8/1990 | Brockhaus | 414/522 |
| 5,076,175 | A * | 12/1991 | Whatley, II | B65D 19/38 108/51.11 |
| 5,482,422 | A * | 1/1996 | Hammond | 414/276 |
| 5,706,738 | A * | 1/1998 | Rapeli | B63B 25/22 108/54.1 |
| D445,620 | S * | 7/2001 | West | B63B 25/22 D6/574 |
| 6,398,283 | B1 * | 6/2002 | Knudtson et al. | 296/26.09 |
| 6,792,879 | B2 * | 9/2004 | de Jong | 108/51.11 |
| 7,118,314 | B2 * | 10/2006 | Zhou | B65D 19/0034 410/46 |
| 7,140,503 | B2 * | 11/2006 | Krummell et al. | 211/151 |
| 7,971,713 | B2 * | 7/2011 | Kim | B60P 3/08 206/335 |
| 7,987,799 | B2 * | 8/2011 | Lange et al. | 108/102 |
| 2005/0241549 | A1 * | 11/2005 | Gordon | B65D 19/0016 108/51.3 |
| 2011/0070061 | A1 * | 3/2011 | Scelfo | 414/781 |

* cited by examiner

TRANSFER PICK

CROSS-REFERENCE TO RELATED APPLICATIONS

The instant application claims priority under 35 U.S.C. §119(e) of prior U.S. Provisional Patent Application Ser. No. 61/673,826, filed 20 Jul. 2012 under the same title and having the same inventive entity as the instant application. The complete disclosure of the prior application is hereby incorporated herein by this reference in its entirely for all purposes.

BACKGROUND

Technical Field

The present disclosure relates to a method and apparatus for pick transfers of articles supported by a pallet.

Brief Discussion of Related Art

Pallets are used in transporting and storing articles. In particular, items to be shipped or stored are stacked and/or bound together into a large contiguous volume on a pallet. The pallet supports the items above the floor or other surface on which the items rest, while providing space beneath the items such that a mechanical device (e.g., pallet jack, forklift) as known in the art can lift the pallet, and the articles on it, to be moved.

Frequently, pallets of articles are stored in warehouses, stacked on pallet racks for efficiency of space. A manual picker will approach the pallet and remove some quantity of items from the pallet as they are needed, leaving the remainder. When articles are stored on the pallet in pallet racks, there are many difficulties for pickers inherent in picking articles not directly in front of them at the point of pick, for example, toward the back of the pallet and the rack. In part due to tight spacing of pallet racks, as a particular pallet is emptied of its contents, the picker must bend and reach to retrieve items, for example from the back of the pallet. These difficulties include pickers experiencing significant stress to the shoulders, upper back and lower back when picking the hard to reach articles by having to bend over, reach a great distance and/or pull out layers of articles. These bending and reaching motions can be a common cause of musculoskeletal injury to the picker. In addition to the human cost of such injuries to the worker, any worker lost-time injuries cost the employer in lost employee productivity, higher employee turnover, higher workers compensation insurance rates, just to name a few. In high-density storage applications, articles, pallets, etc. are stacked off the floor in racks that require a picker be lifted to the level of the items by a lift, for example by forklift, in order to access the articles. For safety, the picker must be tethered to the forklift to prevent a fall. This tether interferes with the picker's ability to reach into a pallet for items, reducing the pickers' level of productivity. Allowing the picker to access articles without reaching from or leaving the lift would improve productivity.

Many prior art methods for addressing these concerns did so by providing additional space about the top and/or sides of the pallet and articles and/or by providing access to same from additional and/or all sides. These prior art solutions, come with a significant cost, in that they generally reduce warehouse storage density and may require that existing racks be redesigned.

SUMMARY

In order to overcome these and other drawbacks and disadvantages in the present state of the art, provided according to the instant disclosure is an article support platform, operatively connected to and supported by a pallet, and/or integrated into the article bearing surface of a pallet, wherein at least a portion of the article bearing surface of the platform is repositionable with respect to the pallet, so as to provide for repositioning of at least some of the articles and/or article bearing portions of the platform to enhance the unloading and/or loading of articles from pallets.

According to aspects illustrated herein, there is provided a method of using an article support platform, operatively connected to and supported by a pallet, and/or integrated into a pallet, wherein at least a portion of the article bearing surface of the platform is re-positional with respect to the pallet. The repositioning allows for article removal and loading to occur at the repositioned location so as to provide for ease in unloading and/or loading articles supported by the platform. The method comprising unloading and/or loading articles from positions useful for unloading and/or loading and then using the article support platform to reposition at least a portion of its surface so that additional positions are now available to the picker for ease in unloading and/or loading articles.

A first aspect of the present disclosure provides an apparatus for transferring articles on a pallet. The apparatus includes a platform positioned on the pallet, the platform having a load bearing surface including a first portion and a second portion. The second portion is movable relative to the first portion from a first position to a second position, such that in the second position the second portion of the platform at least partially overlies the first portion of the platform.

A further refinement of this embodiment includes a locking element selectively movable between an unlocked position wherein the second portion of the platform is free to move with respect to the first portion, and a locked position operative to selectively secure the second portion of the platform. The locking element may be operative to hold the second portion of the platform in one of the first position, the second position, or an intermediate position. Still further, alternately or additionally, one or more detents positioned to receive the locking element and restrict the movement of the second portion are provided. The one or more detents are positioned to hold the second portion in one of the first position, the second position, or an intermediate position. In such cases where the locking element is attached to the second portion of the platform, the locking element may further be operative as a handle by which the second portion is movable. Certain embodiments of the present disclosure comprise a stop operative to block fork pockets of the pallet when the locking element is in the unlocked position.

Optionally according to the first embodiment, the platform further comprises one or more roller bearings operative to support to second portion of the platform in motion between the first and second positions. Still further, one or more tracks corresponding to the one or more roller bearings may be provided to guide the second portion of the platform between the first and second positions.

Also provided according to an aspect of the present disclosure is a method of unloading articles on a loaded pallet. The disclosed method contemplates the pallet having a platform with a load bearing surface including a first portion and a second portion, the second portion being movable relative to the first portion from a first position to a second position, such that in the second position the second portion of the platform at least partially overlies the first portion of the platform. The method comprises arranging the loaded pallet with the second portion of the platform in the first position, unloading loading articles from the first portion of the platform, shifting the second portion of the platform to the second position, and unloading articles from the second portion of the platform. Optionally, the method further comprises arranging the platform with the second portion of the platform being closer to a side of the platform from which articles are loaded the second position than in the first position.

In still further embodiments, the platform comprises a locking element selectively movable between an unlocked position wherein the second portion of the platform is free to move with respect to the first portion, and a locked position operative to selectively secure the second portion of the platform, and the method further includes moving the locking element from a locked position to an unlocked position before shifting the second portion of the platform, and moving the locking element from the unlocked position to the locked position before unloading articles from the second portion of the platform.

In such cases where the locking element is attached to the second portion of the platform, the locking element being further operative as a handle by which the second portion is movable, the method further includes shifting the second portion of the platform by use of the locking element as a handle. Optionally, the disclosed method further comprising blocking fork pockets of the pallet when the locking element is in the unlocked position.

According to yet another aspect of the present disclosure, a method of loading articles on a pallet is disclosed, the pallet having a platform with a load bearing surface including a first portion and a second portion, the second portion being movable relative to the first portion from a first position to a second position, such that in the second position the second portion of the platform at least partially overlies the first portion of the platform. The method of loading includes arranging the unloaded pallet with the second portion of the platform in the second position, loading articles onto the second portion of the platform, shifting the second portion of the platform to the first position, and loading articles onto the first portion of the platform. Optionally, the method further comprises arranging the platform with the second portion of the platform being closer to a side of the platform from which articles are loaded the second position than in the first position.

In still further embodiments, the platform comprises a locking element selectively movable between an unlocked position, wherein the second portion of the platform is free to move with respect to the first portion, and a locked position operative to selectively secure the second portion of the platform. The method further includes moving the locking element from a locked position to an unlocked position before shifting the second portion of the platform, and moving the locking element from the unlocked position to the locked position before loading articles onto the first portion of the platform.

In such cases where the locking element is attached to the second portion of the platform, the locking element being further operative as a handle by which the second portion is movable, the method further includes shifting the second portion of the platform by use of the locking element as a handle. Optionally, the disclosed method further comprising blocking fork pockets of the pallet when the locking element is in the unlocked position.

In a second embodiment, repositioning of the surface of the platform is accomplished by the rotation of the surface of the platform with respect to the pallet.

The re-positioning of the platform surface allows for portions of the platform surface, including articles supported by or to be supported by those portions of the platform surface, to become more easily accessible by pickers for unloading and/or loading articles thereon. Some of the advantages of picking off and loading on the apparatus of the present disclosure when compared to picking off a pallet are: safety, a greatly reduced reach results in better ergonomics and picking positions off the ground may not require climbing into the rack; storage density, the entire surface can be used to store articles, as there is no need to leave space between the articles or above the articles for picker access, rack beam levels can be closer together because additional clearance is no longer needed between levels for reaching in; and labor costs, as it is easier to reach articles, the articles are picked more efficiently resulting in more picks in less time.

Even when not in a space-limited environment, the methods and apparatuses allow for the picker to remain facing one side of the pallet in unloading and loading, and thus in certain case eliminating the need for the picker to reposition themselves and/or articles in order to unload and/or load another side of the pallet. This is a particular benefit in the case of a raised and tethered picker, as discussed above. Thus, embodiments of the present disclosure may be positioned on a pallet on the floor and used to create an ergonomic advantage for a person picking boxes from a specific position and/or positioned in an elevated pallet rack location that will be picked with assistance from either a fork truck, order picker, or similar type device.

Additionally, by way of example and not limitation, embodiments of the apparatuses and methods of the present disclosure may be used: on pallets located in pallet rack, still accessible by a worker on the floor, to reduce reaching; when loading pallets in the reverse order which grants both time savings and ergonomic benefits; and/or in industrial environments such as alongside assembly lines to aid in ergonomics.

BRIEF DESCRIPTION OF THE DRAWINGS

These and other purposes, goals and advantages of the present disclosure will become apparent from the following detailed description of example embodiments, read in connection with the accompanying drawings. Some embodiments are illustrated by way of example and not limitation in the figures of the accompanying drawings, in which like reference numerals refer to like structures across the several views, and wherein.

DETAILED DESCRIPTION

First Embodiment

Translational Repositioning

Figure 1:
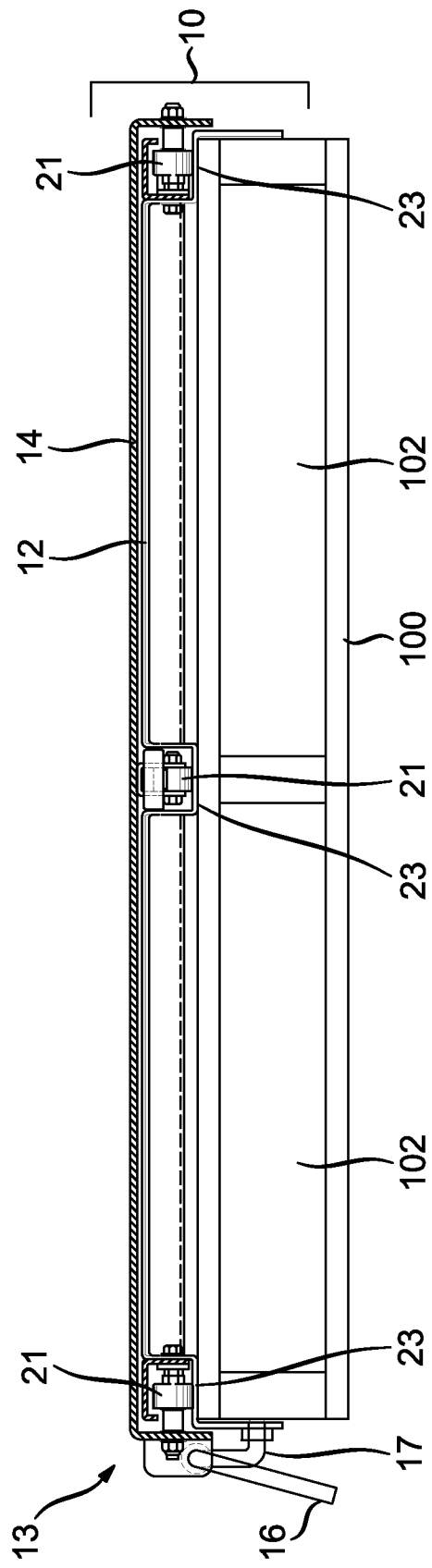
FIG. 1 is an front view drawing of a first embodiment of the apparatus of the present disclosure.

Referring generally to FIGS. 1-12, a first embodiment of the apparatuses and methods of the present disclosure provides a platform 10 including functionality for translational repositioning of articles and/or one or more portions of the apparatus with respect to the pallet 100. In one version of this embodiment, taking for example FIG. 1, the surface 13 of the platform 10 is divided into two portions, a first portion 12 and a second portion 14. In a first orientation of the platform 10, the first portion is made more accessible for unloading and loading articles as compared to the second portion 14 in the first orientation. For example, see FIGS. 4-6. Reorienting the surface 13 of the platform 10 is accomplished by translation of the second portion 14 so as to at least partially overlap the first position 12. In certain embodiments of the present platform 10, one or more rollers 21 are provided to support the second portion 14 of the platform 10 and facilitate movement of the second portion 14 with respect to the first portion 12. Rollers 21 may also work in conjunction with one or more tracks 23 that receive and guide the rollers 21. In the depicted embodiment, the rollers 21 are connected with the second portion 14, and the guides 23 in the first portion 12. This could easily be reversed without departing from the scope of the present disclosure.

Figure 2:
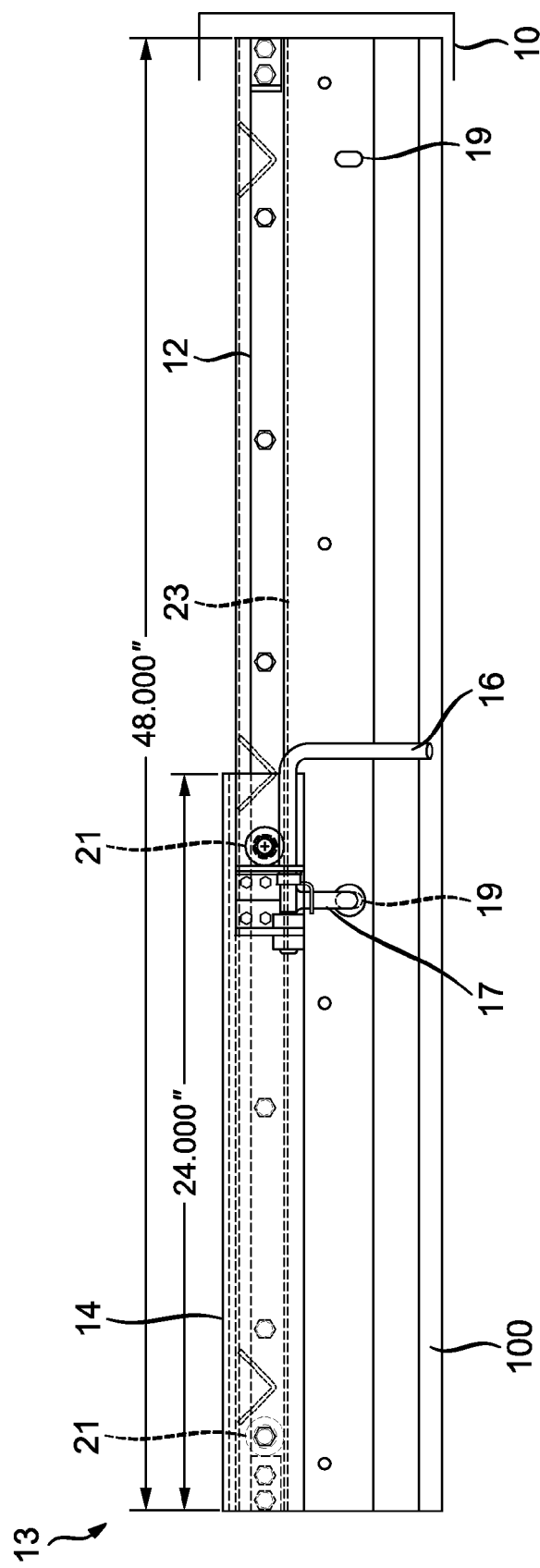
FIG. 2 is an illustrative side view drawing of a first embodiment of the apparatus of the present disclosure.
Figure 3:
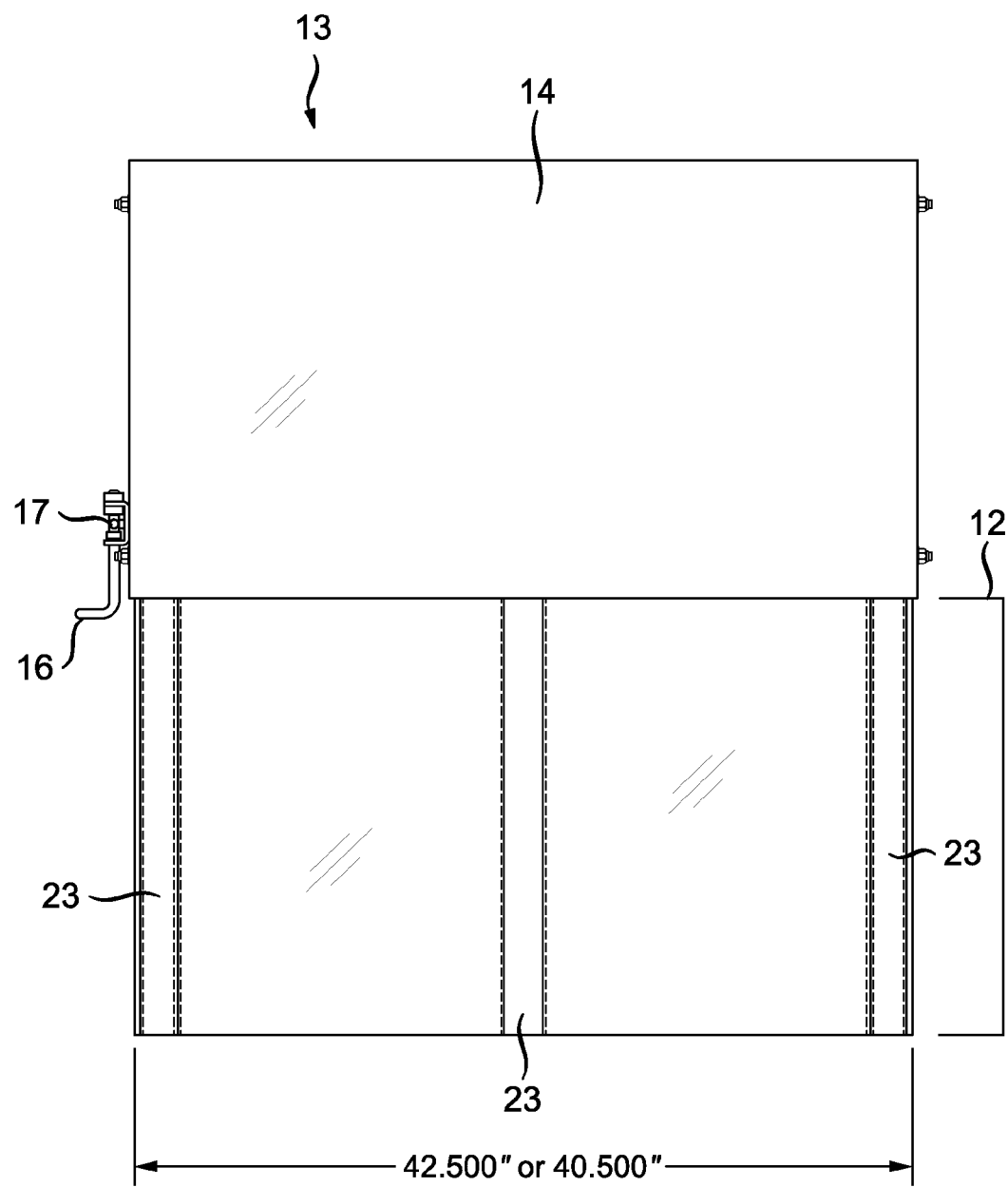
FIG. 3 is an illustrative top view drawing of a first embodiment of the apparatus of the present disclosure.

In this embodiment, a lever 16 controls the engagement of locking element 17. Locking element 17 in turn engages one or more detents 19 provided at predetermined locations of the platform 10. The locking element 17 engaged in the detent 19 holds the second portion 14 of the surface 13 in position. Moving the lever 16 disengages the locking element 17. A user, for example, the picker, then may pull or push on the lever 16, or otherwise urge the second portion 14, for example by urging parcels located thereon, to reposition the second portion 14 with respect to the first portion 12. FIGS. 1, 2 and 3 show illustrative front, side and top view drawings, respectively, of an embodiment of the translational repositioning apparatus.

Figure 4:
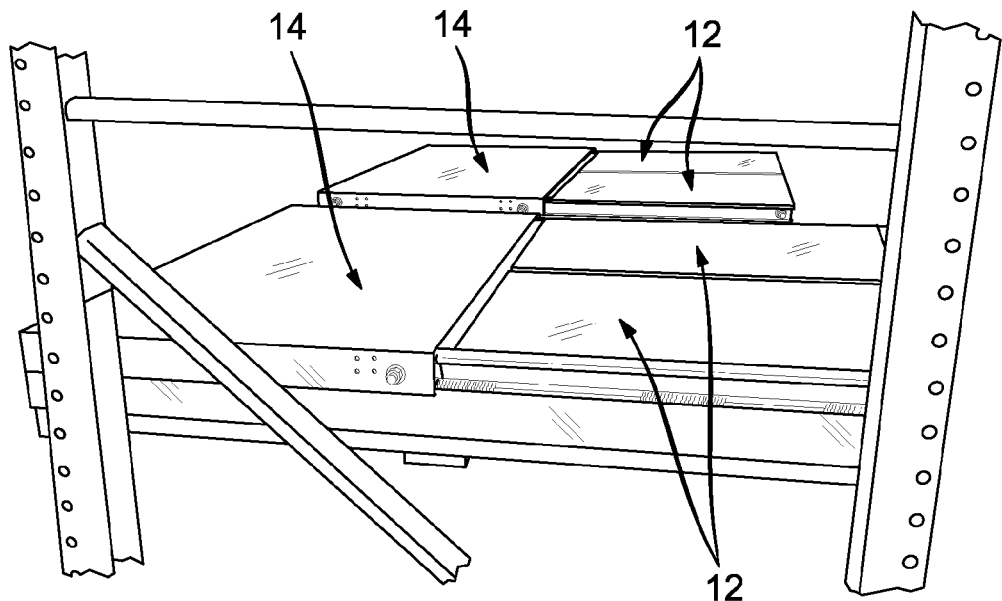
FIG. 4 illustrates a first embodiment of the apparatus of the present disclosure, showing two such apparatuses each on pallets and in a two pallet rack configuration, the view being generally from the side of the pallet rack.
Figure 5:
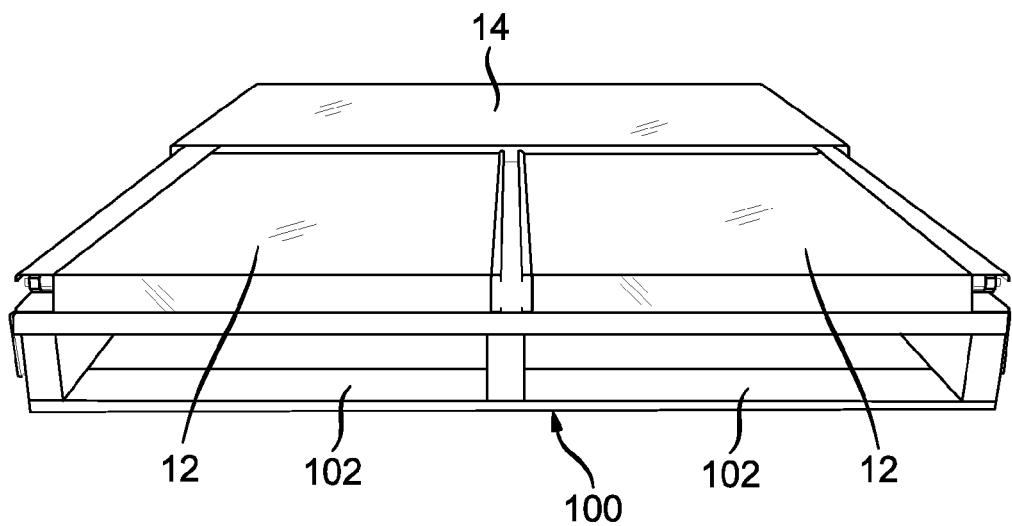
FIG. 5 illustrates the first embodiment of the apparatus of the present disclosure showing the apparatus on a pallet in a pallet rack, the view being generally looking into the front side of the pallet rack.
Figure 6:
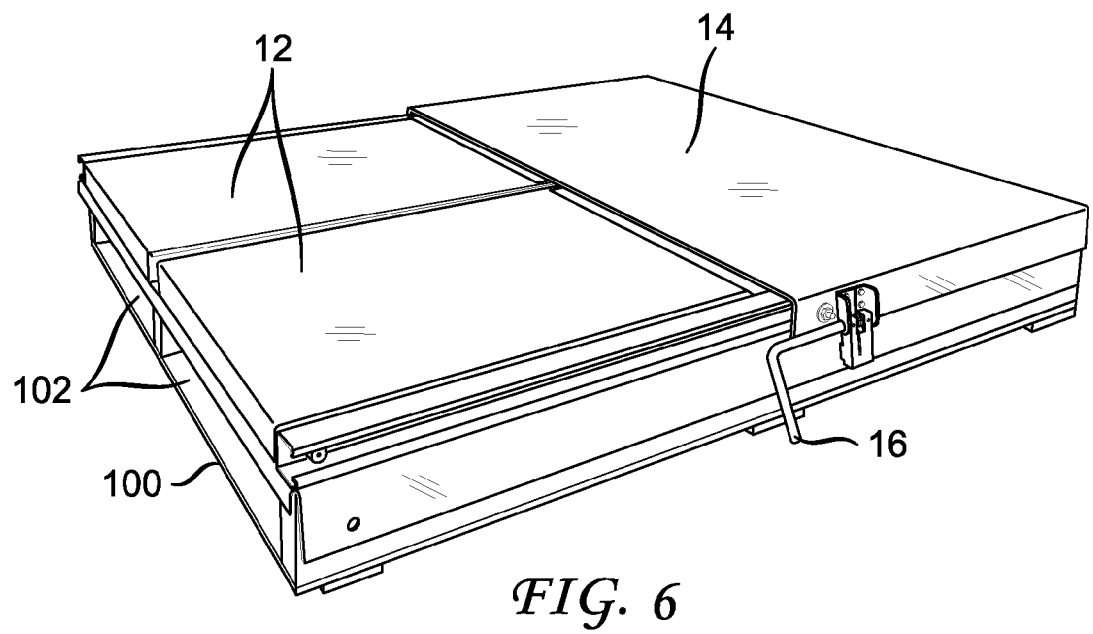
FIG. 6 illustrates the first embodiment of the apparatus of the present disclosure showing the apparatus on a pallet in a pallet rack, the view being generally in a downward direction to the apparatus from a side and front of the pallet rack.

FIGS. 4, 5 and 6 show illustrations taken from different positions with respect to the pallet 100 and the platform 10. As shown in FIGS. 4, 5 and 6, the first portion 12 and second portion 14 are in a non-overlapping orientation, and unloaded state having no items thereon. FIG. 6 shows the lever 16, useful to reposition the second portion 14, in its down and locked state.

Figure 7:
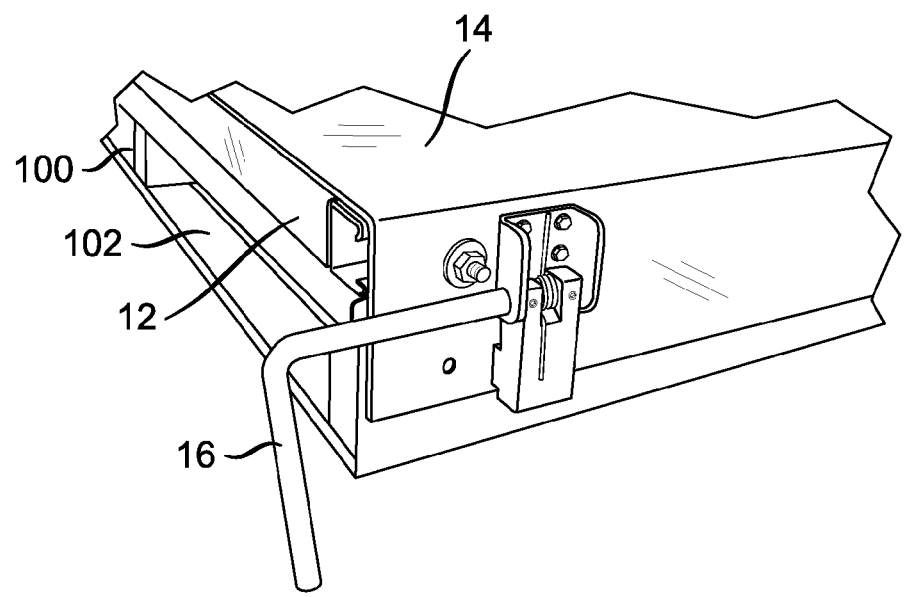
FIG. 7 illustrates the first embodiment of the apparatus of the present disclosure showing the apparatus on a pallet in a pallet rack in more particular detail, wherein a second portion (14) has been repositioned to overlap the first portion (12), looking in a downward direction to the apparatus at an angle to the front of the rack.

FIG. 7 shows the platform 10 having the second portion 14 in an orientation overlapping the first portion 12, and with the lever 16 in the down position such that the locking element 17 in engaged in a detent 19. The lever 16 may be rotated to the unlocked position, in which case the second portion may be repositioned between non-overlapped, partially overlapped and overlapped positions.

In FIGS. 1-12, the lever 16 is shown rotating about an axis parallel with the direction of travel of the second portion 14. This means that additional space will be required laterally of the platform 10 to transition the lever 16 between locked and unlocked positions. It will be apparent however, to one or ordinary skill in the art being apprised on the instant disclosure, that the direction of rotation may be altered to avoid this necessity, for example to make the axis of rotation of the lever 16 in releasing or engaging the locking element 17 transverse to the direction of movement of the second portion 14, while maintaining the functionality of the lever 16 and locking element 17, all without departing from the scope of the instant disclosure.

With reference to the discussion of the second embodiment, infra, it may be likewise advantageous in the present embodiment to block the fork pockets 102 of the pallet 100 while the moving second portion 14 is unlocked, in order to prevent the pallet 100 from being lifted while the second portion 14 is free to move. Lifting the pallet 100 with the second portion 14 unlocked may lead the second portion and the articles thereon to shift suddenly, possibly falling, leading to damaged goods, and even injury of workers in the vicinity.

Figure 8:
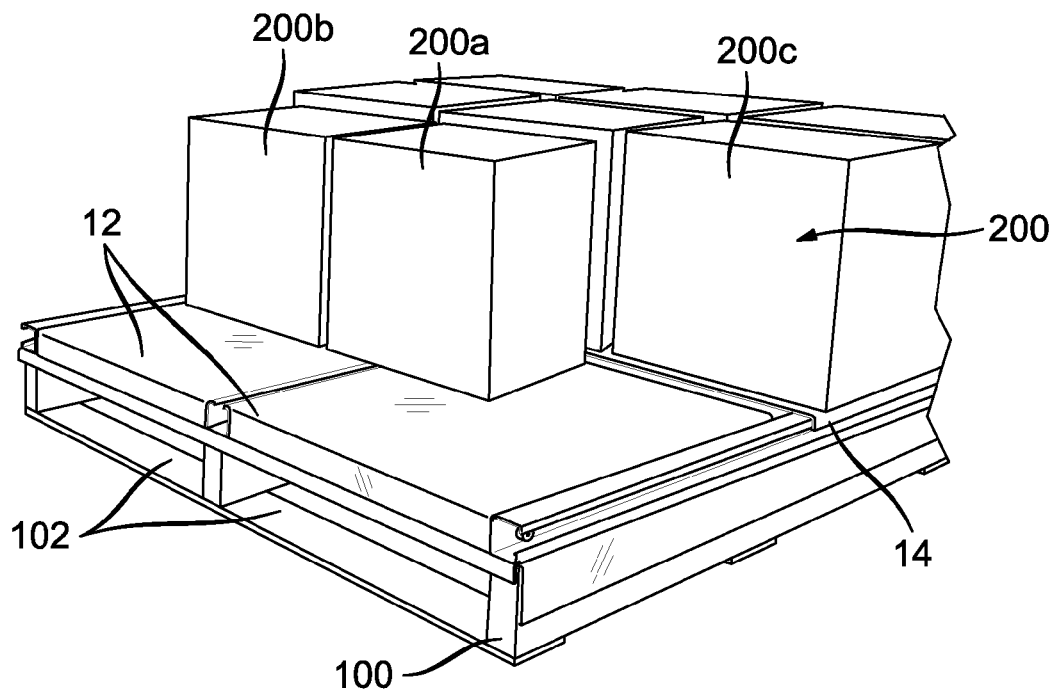
FIG. 8 illustrates the first embodiment of the apparatus of the present disclosure showing articles on the first and second portions of the apparatus.
Figure 9:
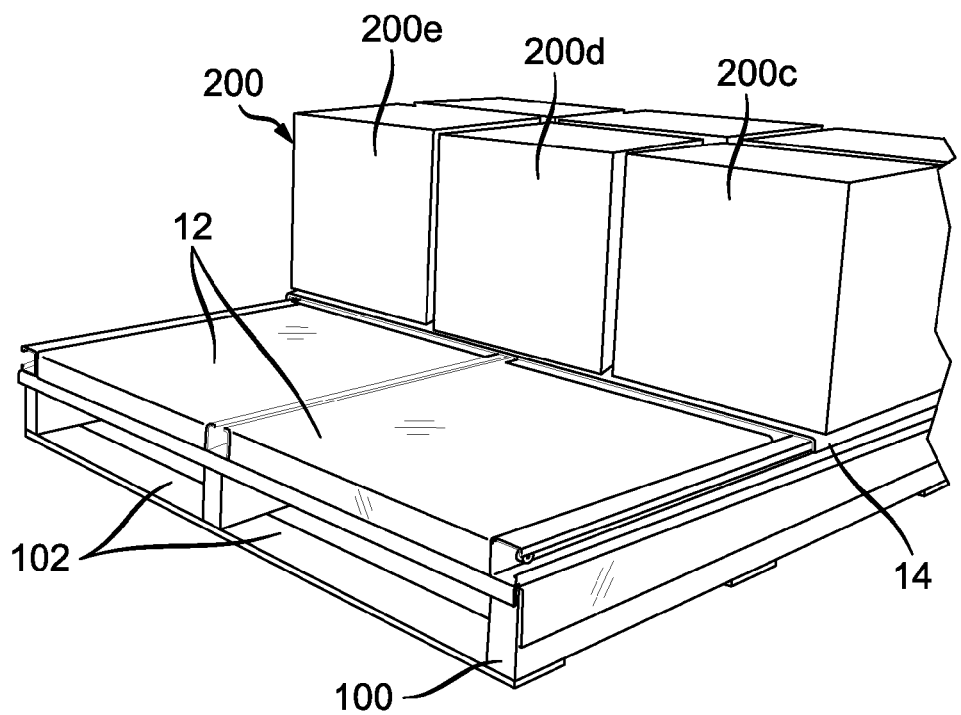
FIG. 9 illustrates the first embodiment of the apparatus of the present disclosure after the articles on the first portion (12) of the apparatus shown in FIG. 8 have been removed.
Figure 10:
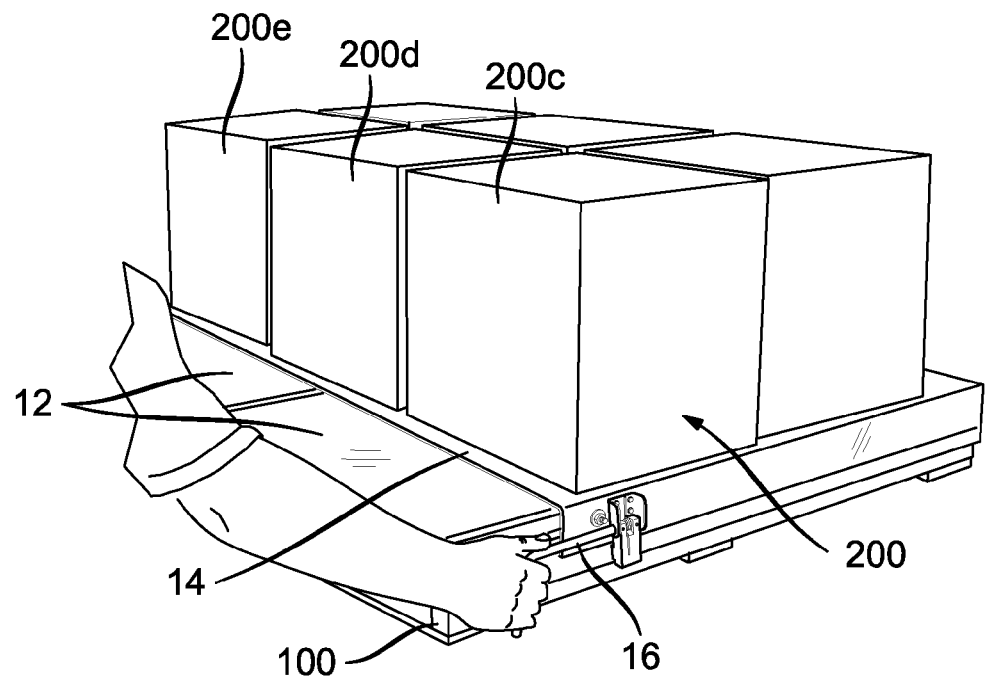
FIG. 10 illustrates the first embodiment of the apparatus of the present disclosure shown in FIG. 9 after the second portion (14) has been repositioned to partially overlap the first portion (12)

FIG. 8 shows the platform 10 having first portion 12 and second portion 14 in the non-overlapped orientation, and moreover both first portion 12 and second portion 14 14 are loaded with articles, collectively reference 200, and individually 200a, 200b, 200c, etc. In particular, articles 200a, 200b rest on the first portion 12, and the remaining ones of articles 200 rest on the second portion 14. FIG. 9 shows the platform 10 of FIG. 8 after articles 200a, 200b on the first portion 12 have been unloaded. FIG. 10, in turn, shows the platform of FIG. 9 after lever 16 has been rotated to the unlocked position, and further a pulling force applied to lever 16. thereby repositioning the second portion 14 so as to partially overlap the first portion 12. This brings the articles 200c, 200d, 200e, etc. resting on the second portion 14 closer to the picker.

Figure 11:
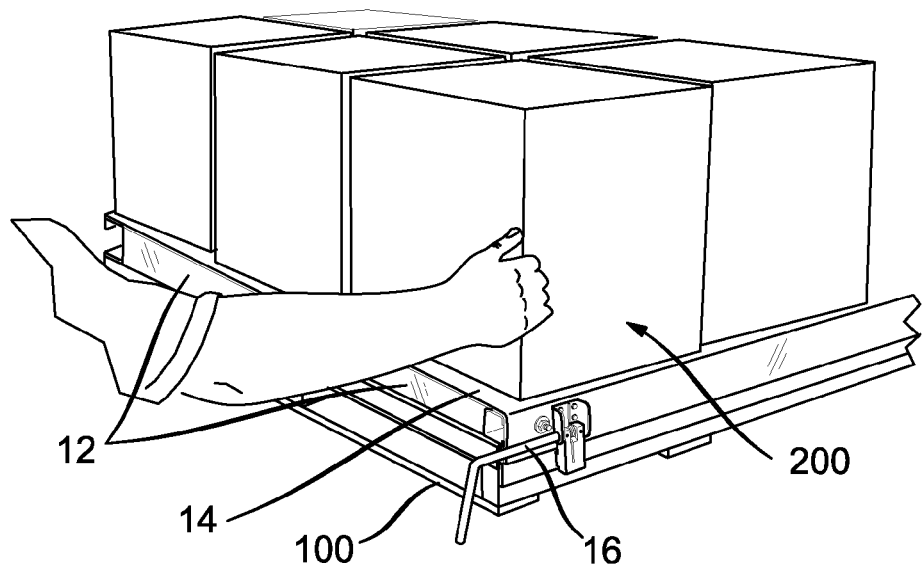
FIG. 11 illustrates the first embodiment of the apparatus of the present disclosure shown in FIG. 10 after the second portion has been repositioned to more completely overlap the first portion and an article is in the process of being removed from the repositioned second portion.
Figure 12:
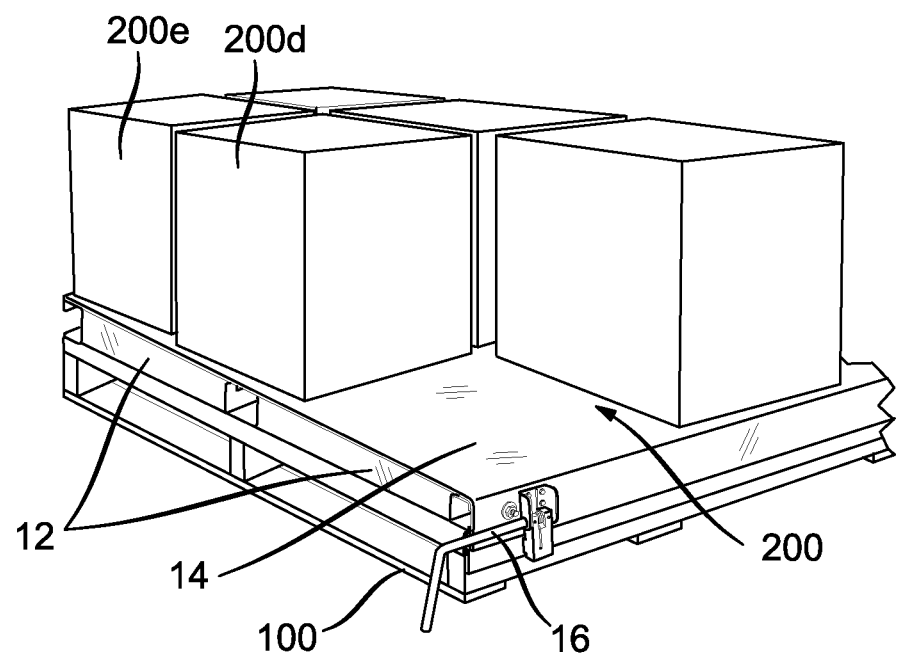
FIG. 12 illustrates the first embodiment of the apparatus of the present disclosure shown in FIG. 11 after the article has been removed from the repositioned second portion.

FIG. 11 shows the platform 10 of FIG. 10, with the second portion 14 overlapping the first position 12, the lever 16 being moved into a down and locked position thereby engaging the locking element 17 in a detent 19. FIG. 12 shows the platform 10 from FIG. 11 after article 200c has been unloaded from the platform 10. While the above depiction and description entails articles 200 stacked on the platform 10 in a single layer only, it will be apparent that more layers of articles 200 can be included if they are so stacked on the pallet.

According to the foregoing unloading method, articles 200 are brought nearer to a front of the platform 10, and thus nearer to the picker. This reduces or eliminates bending or stretching for articles 200 on a back of the pallet.

In many circumstances, articles 200 will arrive in the warehouse facility palletized in contiguous bundles on pallets 100 and/or platforms 10, and are subsequently removed from the pallet 100 and platform 10 separately on demand. However, it may be necessary to load or reload a pallet 100 with articles 200 as the pallet 100 sits on the pallet rack. It will be apparent to one of ordinary skill in the art that the unloading of the platform 10, described above with respect to FIGS. 8-12, can be reversed in order to load articles 200 on to the platform 10, again while reducing or eliminating bending, reaching etc., on the part of the picker.

Second Embodiment

Rotational Repositioning

A second embodiment of the apparatuses and methods of the present disclosure, depicted generally in FIGS. 13-24, provides for rotational repositioning of articles and supporting platform preferably in 90 degree or 180 degree increments, however, other embodiments provide for almost any amount of rotation from 0 degrees to 360 degrees, or more. The apparatus may also be provided with a mechanism to rotationally lock it in place after the desired rotation.

The apparatus comprises a turntable or other rotating means, affixed to a pallet and a platform or flat surface on which to stack the articles. In another embodiment, the apparatus is integrated into the pallet. In still another embodiment, the apparatus, comprises a turntable, separate from the pallet, but positioned on the load bearing side of the pallet. In this case, the apparatus may be permanently or temporarily secured to the load bearing face of the pallet, or may merely be placed upon said load bearing pallet face. Thus, after the combination of pallet, apparatus and articles are placed in pallet racks, the present disclosure allows for the articles to be rotatably repositioned while remaining in the pallet rack, and thus provide for easier access to said articles for ergonomic and efficient picking.

In this embodiment, rotational repositioning of the platform and/or articles may require additional clearance as the turntable portion swings through its arc, this is addressed in some embodiments simply by reducing the size of the turntable to increase clearance based on beam dimensions.

Figure 13:
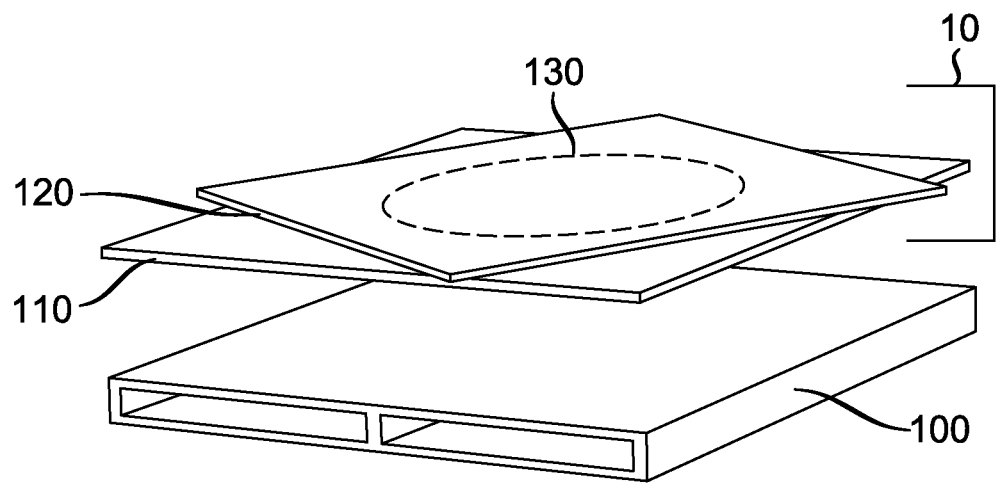
FIG. 13 illustrates a second embodiment of the apparatus of the present disclosure and a pallet.
Figure 14:
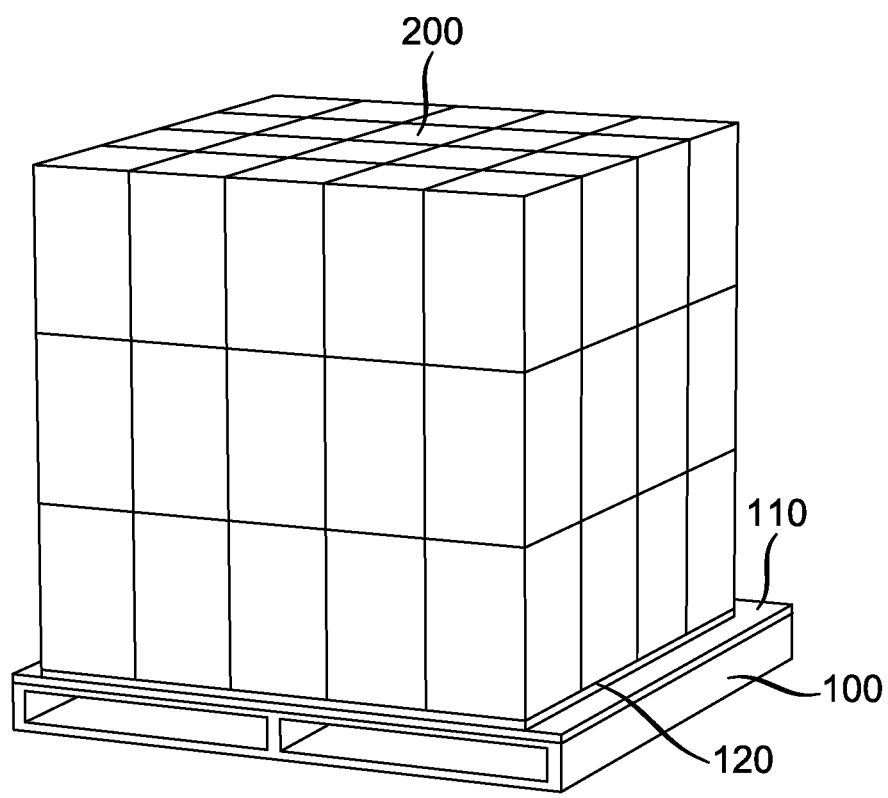
FIG. 14 illustrates a second embodiment of the present disclosure showing the apparatus positioned on the pallet, the apparatus loaded with boxes.

FIG. 13 shows the second embodiment of the present disclosure, in this embodiment the apparatus comprises the pallet cover (110) mounted on the pallet (100), the turntable bearing (130) mounted on the pallet cover, and the turntable cover (120). FIG. 14 shows the articles or boxes (200) three high, four deep and five across positioned on the turntable cover (120).

Figure 15:
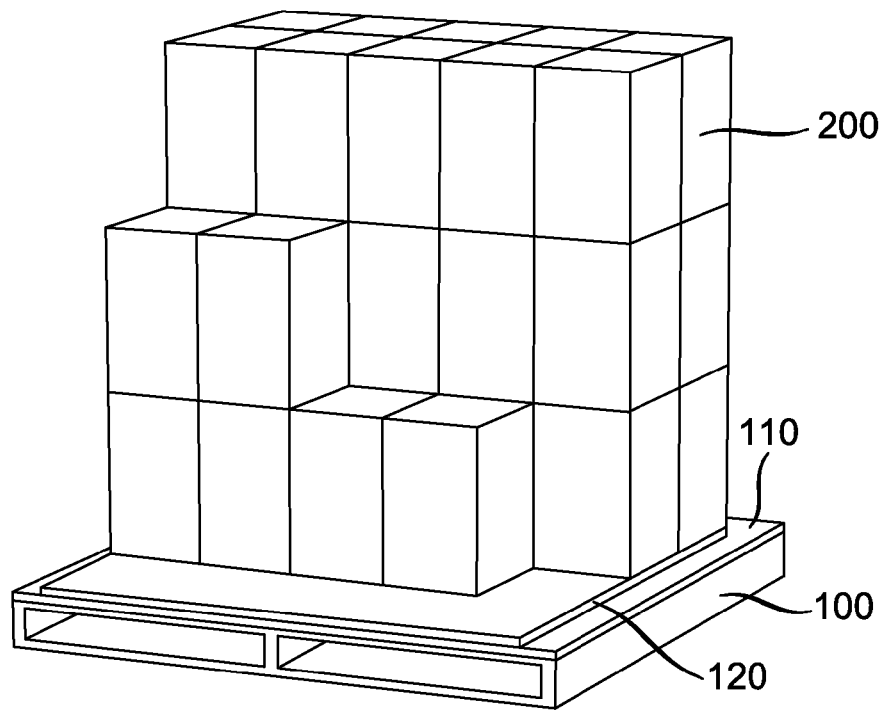
FIG. 15 illustrates the second embodiment of the present disclosure showing the pallet and apparatus after the first few boxes are picked.
Figure 16:
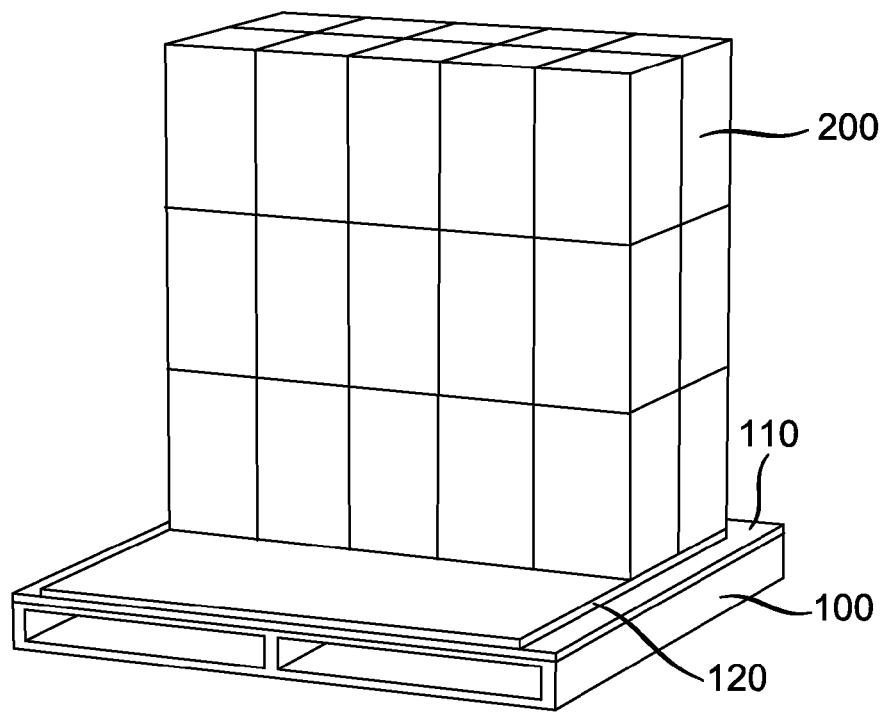
FIG. 16 illustrates a further embodiment of the present disclosure showing the pallet and apparatus after half the boxes are picked.
Figure 17:
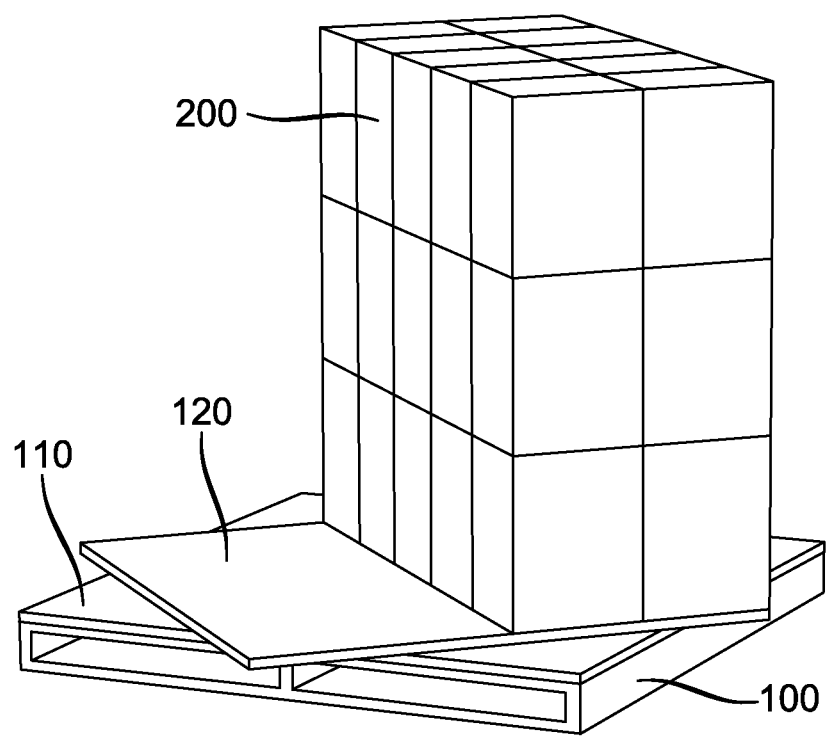
FIG. 17 illustrates the second embodiment of the present disclosure showing the apparatus after its top part has been rotated approximately 45 degrees.
Figure 18:
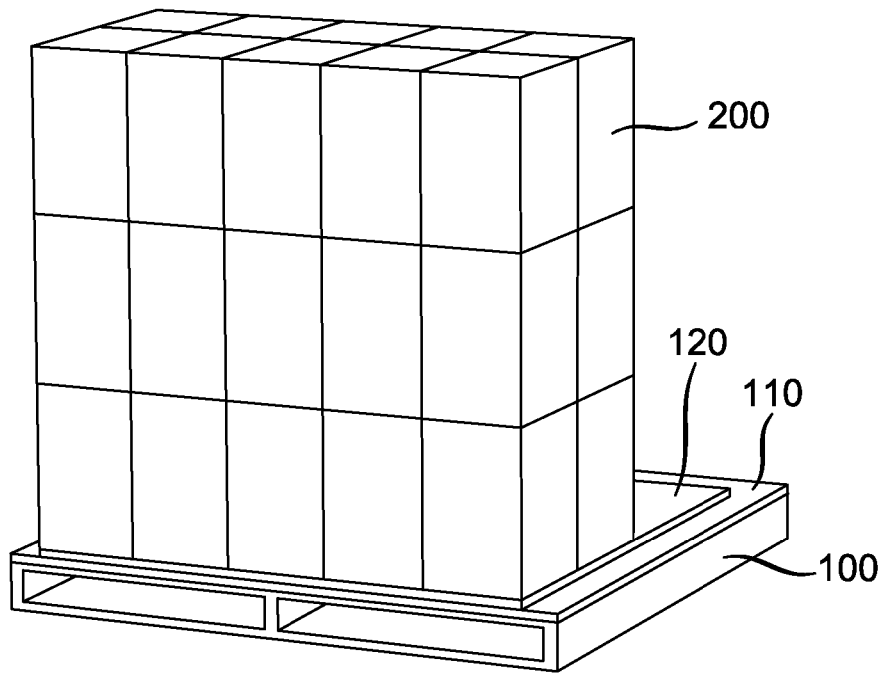
FIG. 18 illustrates the second embodiment of the present disclosure showing the apparatus after its top part has been rotated 180 degrees and is ready for continued picking.
Figure 19:
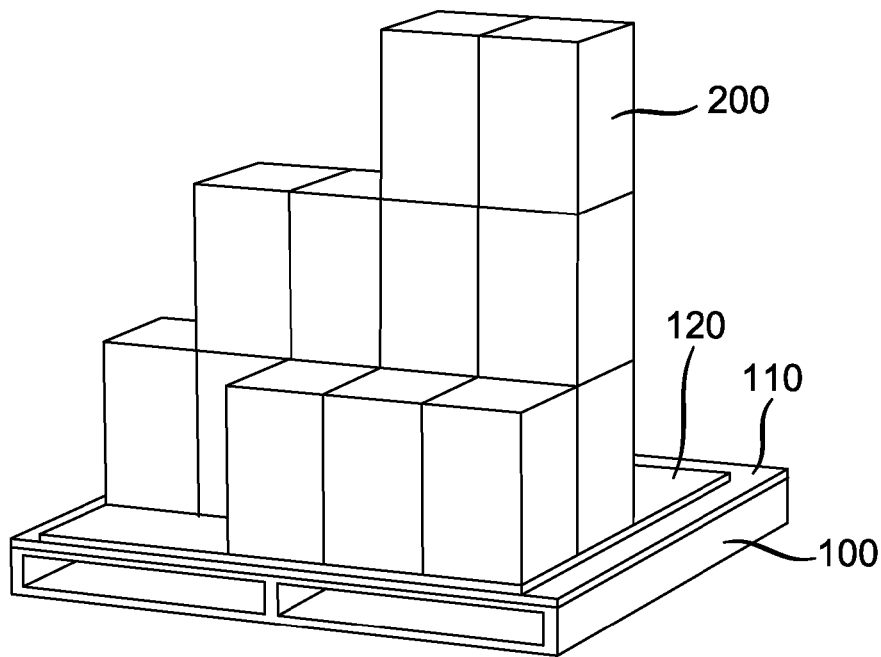
FIG. 19 illustrates the second embodiment of the present disclosure showing the apparatus after it has been rotated 180 degrees and after some additional picking.

FIG. 15 shows the pallet and apparatus after the first few boxes are picked. FIG. 16 shows the pallet and apparatus after half the boxes are picked. FIG. 17 shows the apparatus after its top part bearing the boxes has been rotated approximately 45 degrees. FIG. 18 shows the apparatus after its top part (in this case the turntable cover 120) has been rotated 180 degrees and is ready for continued picking. FIG. 19 shows the pallet and apparatus after some additional picking, which has occurred after the 180 degrees rotation of the apparatus and boxes shown in FIG. 18.

While the second embodiment above is disclosed in connection with removing boxes or articles from a pallet, the method and apparatus also provides for the loading of articles, including boxes in a similar manner.

Figure 20A:
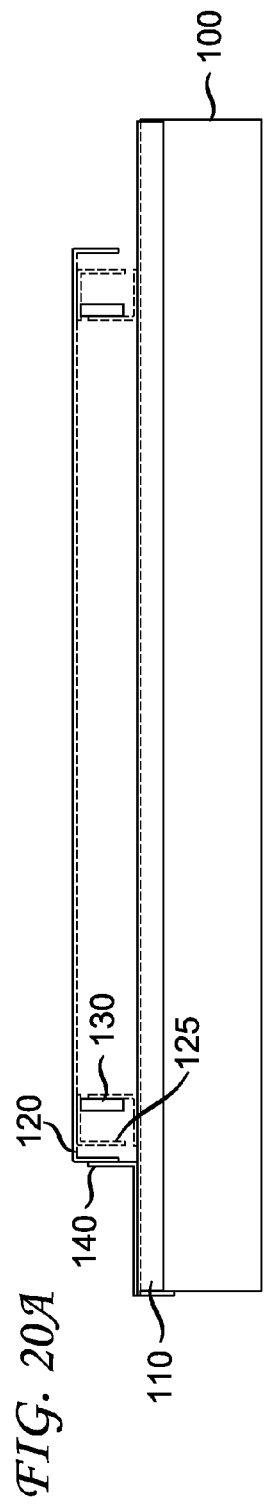
FIGS. 20A, 20B and 20C illustrate the second embodiment of the present disclosure, showing a second embodiment of the hinged stop or detent of the apparatus, which is used to stop the apparatus from rotating, with the detent shown successively in a locked position in FIG. 20A, an intermediate position in FIG. 20B, and an unlocked position in FIG. 20C.
Figure 20B:
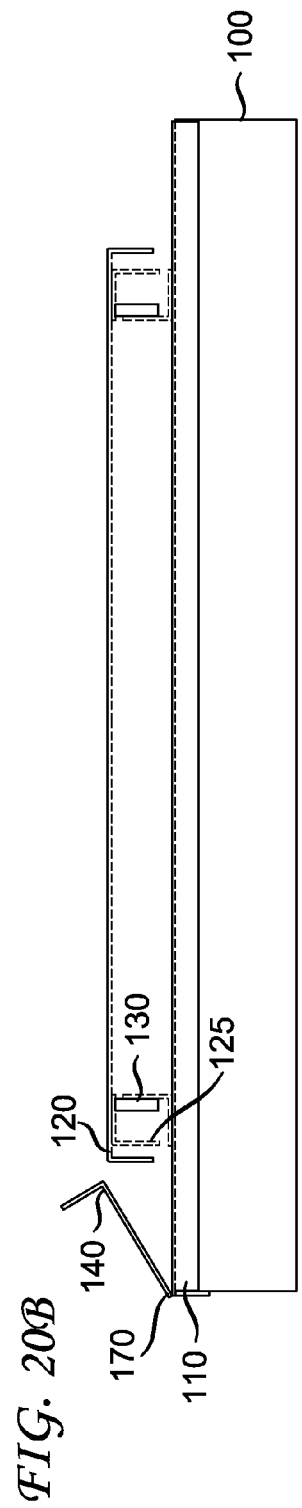
Figure 20C:
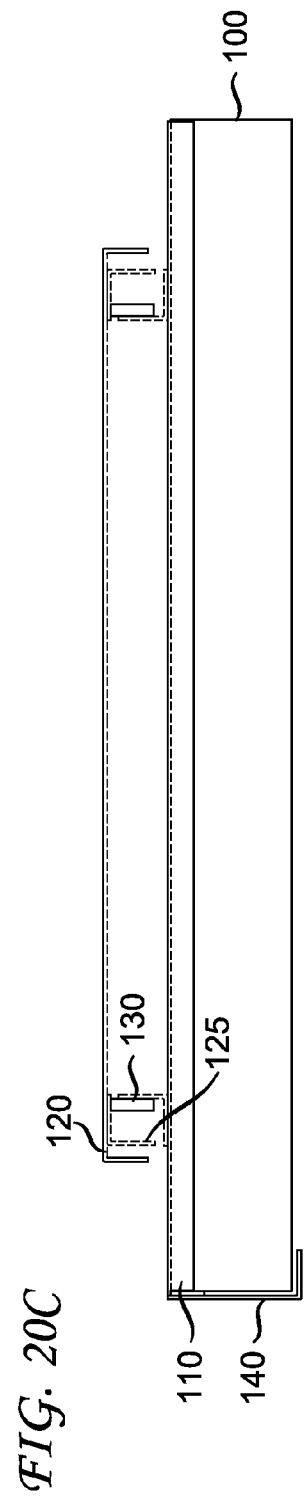
Figure 21:
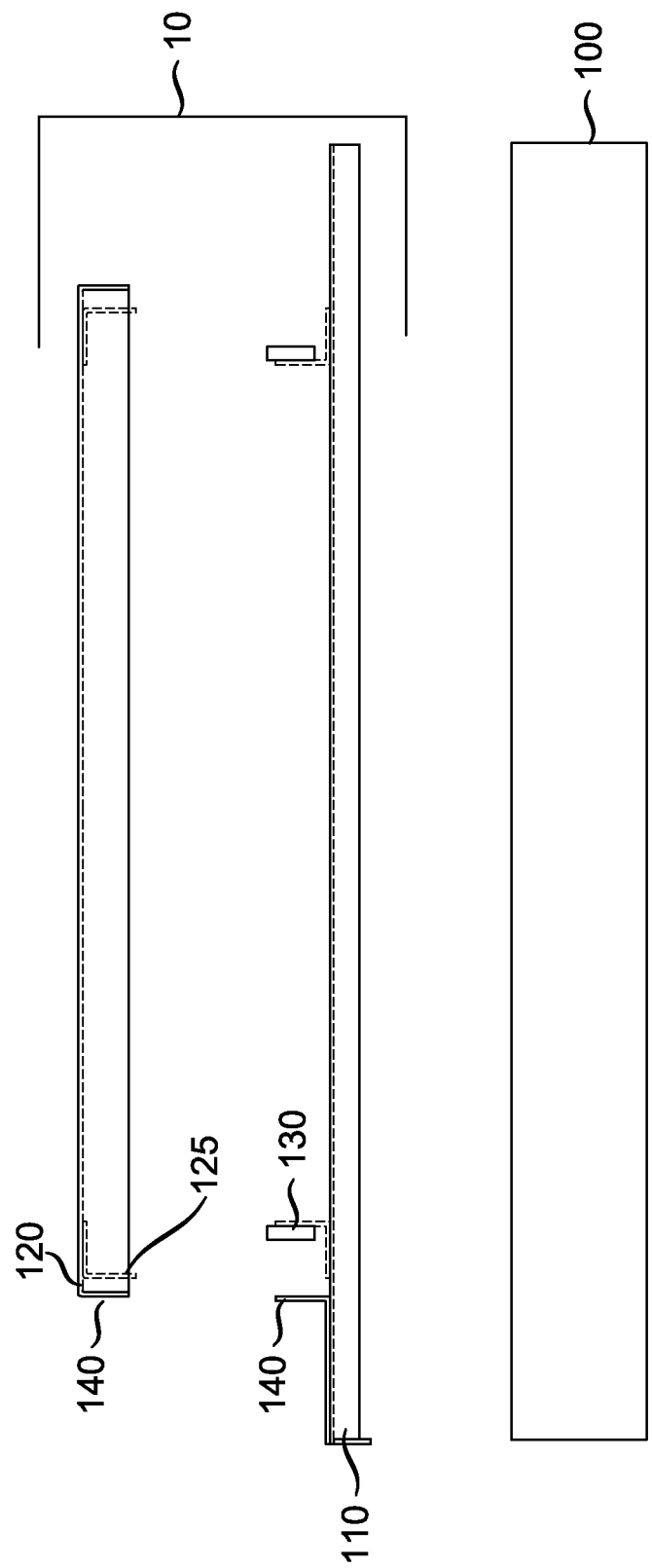
FIG. 21 illustrates a rotating platform (120) and the turntable bearing (130) components of a second embodiment of the present disclosure over a pallet.

In the second embodiment as shown, the detent or stop 140 shown in FIGS. 20A, 20B, and 20C is a full width piece of sheet metal bent in a right angle and hinged to the pallet cover across the front of the unit. In other embodiments, any suitable material may be substituted for sheet metal without departing from the scope of the present disclosure. When in the locked position, e.g., FIG. 20A, the turntable cover 120 cannot rotate in either direction due to interference with the detent. The stop may be rotated about its hinge or pivot 170, as shown for example in FIG. 20B. When the stop is rotated approximately 270 degrees, as for example in FIG. 20C, it no longer prevents the turntable cover from rotating. Also shown is the turntable or carousel carriage 125. In one embodiment, the stop acts as a safety device, by blocking the fork pockets of the pallet, and thus preventing the pallet from being lifted while the turntable cover 120 is unlocked. To lock the device, the user simply flips the lock back into the upright position, with the turntable cover 120 positioned square to the front of the unit. FIG. 21 shows an exploded assembly view of this second embodiment of the present disclosure 10, the pallet 100, the pallet cover 110 with turntable bearing 130 and stop 140, the turntable or carousel carriage 125, and the turntable cover 120.

Figure 22:
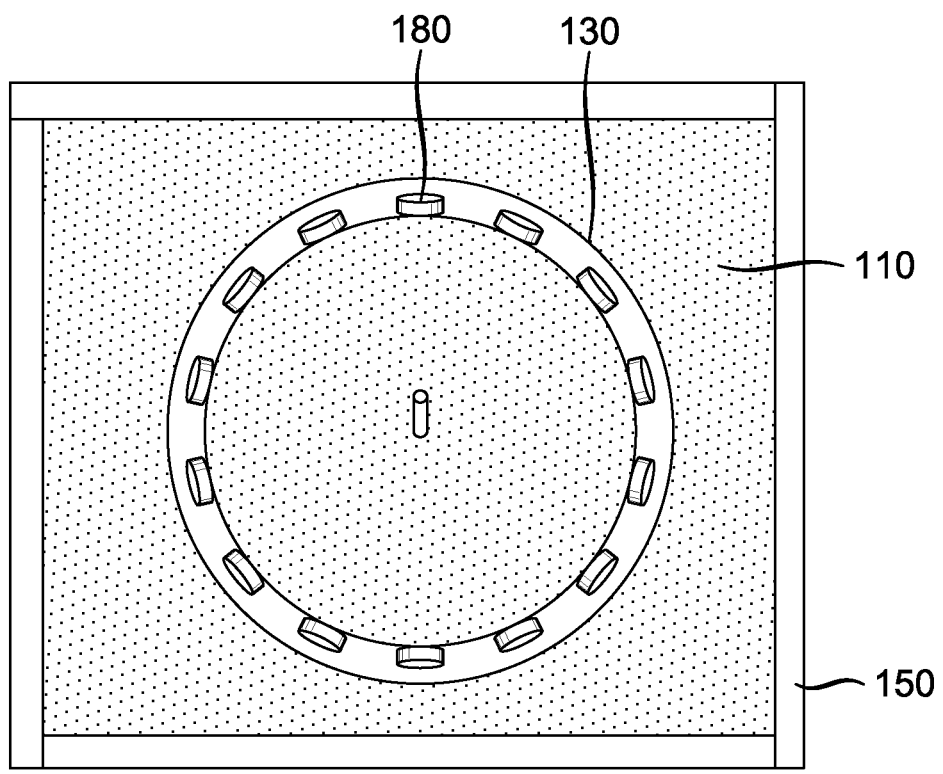
FIG. 22 illustrates the second embodiment of the present disclosure showing the apparatus with the platform removed.

FIG. 22 is an illustrative drawing of another embodiment of the present disclosure showing the apparatus with the platform removed, wherein the bearing function is carried out by wheels 180 provided as part of a manual carousel, which is manufactured by Vestil Manufacturing Corp., 2999 North Wayne Street, Angola, Ind. 46703, and has part number Manual Carousel CA-30-2. In this embodiment, the pallet measures 42 inches×48 inches and the rotating platform is 37.5 inches×37.5 inches. Of course depending on the use and articles other carousels, turntables or other rotation devices may be used. In one embodiment, the pallet cover has one or more downwardly extending edges 150, and when the pallet cover is mounted on the pallet said one or more downwardly extending edges face one or more sides of the pallet.

Figure 23:
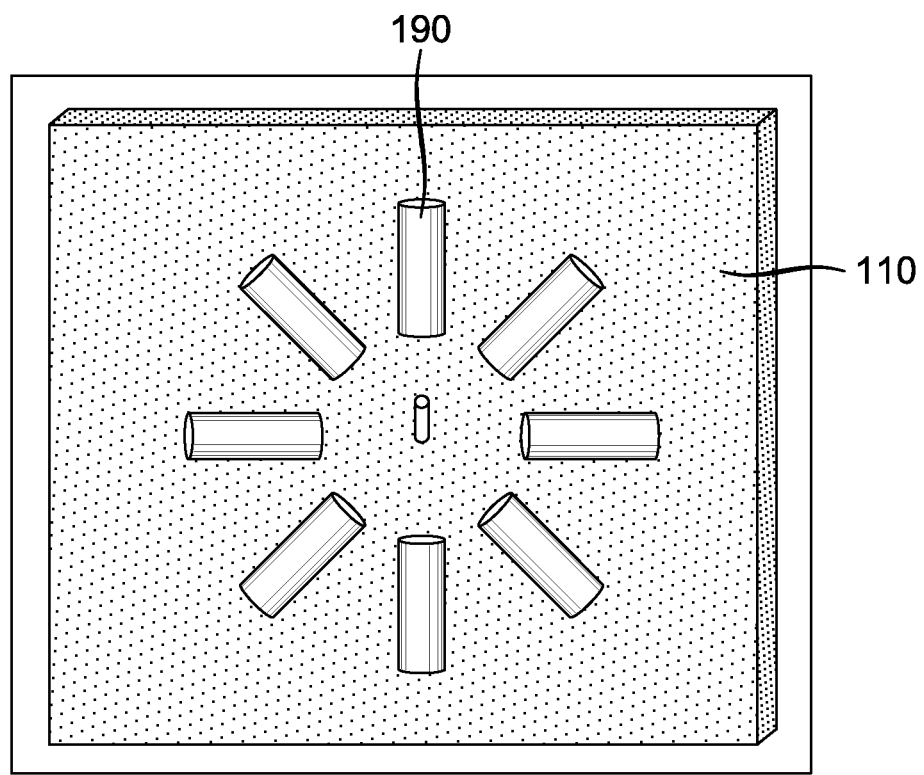
FIG. 23 illustrates the second embodiment of the present disclosure showing the apparatus with the platform removed, and further showing the cylindrical rollers.

FIG. 23 is an illustrative drawing of one embodiment of the present disclosure showing the apparatus with the platform removed, wherein the bearing function is carried out by steel rollers 190, such as those provided by Unex Manufacturing Inc., 50 Progress Place, Jackson, N.J. 08527.

Figure 24:
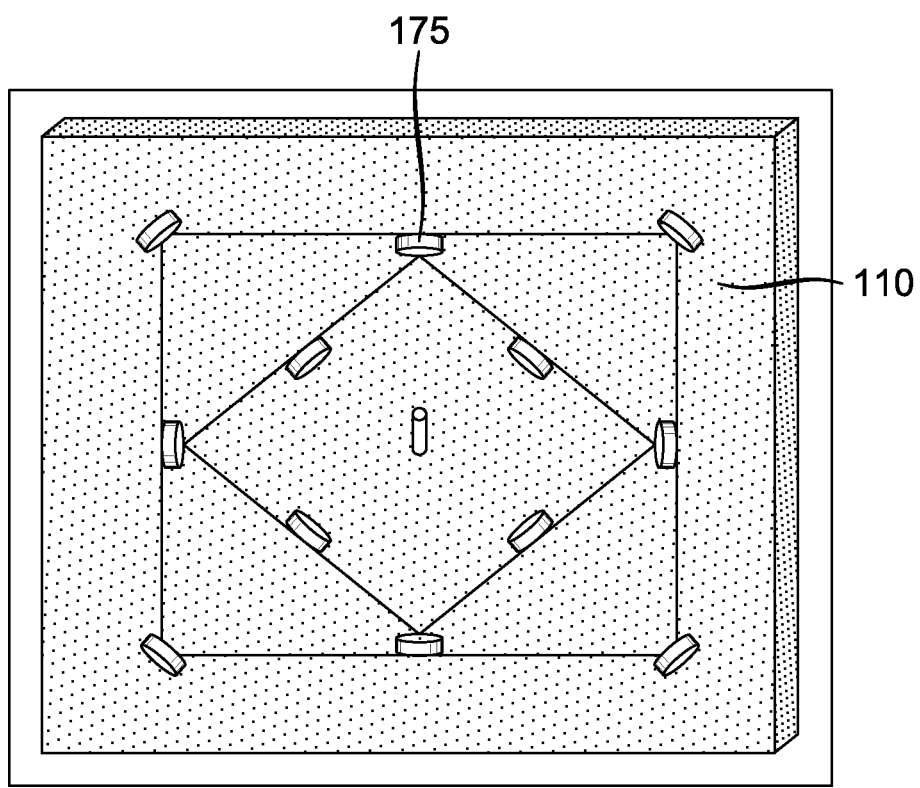
FIG. 24 illustrates the second embodiment of the present disclosure showing the apparatus with the platform removed, and further showing the bearing wheels which provide the ability for the platform to rotate.

FIG. 24 is an illustrative drawing of one embodiment of the present disclosure showing the apparatus with the platform removed, wherein the bearing function is carried out by bearing wheels 175 provided by Unex Manufacturing Inc., 50 Progress Place, Jackson, N.J. 08527.

Although embodiments of the present disclosure have been described above in detail, it is desired to emphasize that this has been for the purpose of illustrating and describing the disclosure, and should not be considered as necessarily limitative of the disclosure, it being understood that many modifications can be made by those skilled in the art while still practicing the invention, which is defined solely according to the following claims.

What is claimed:

1. An apparatus for transferring articles on a pallet, the apparatus comprising:
   a pallet comprising four sides, a bottom surface and a top surface, wherein the pallet comprises a fork pocket in at least one of the four sides;
   a platform positioned on the pallet, the platform having a load bearing surface including a first portion and a second portion, wherein the second portion is adapted for translational movement relative to the first portion from a first position to a second position, such that in the second position the second portion of the platform at least partially overlies the first portion of the platform, wherein each of the first and second portions comprise substantially rectangular planar surfaces;
   a locking element selectively movable between an unlocked position wherein the second portion of the platform is free to move with respect to the first portion, and a locked position operative to selectively secure the second portion of the platform, the locking element further comprising:
      one or more detents positioned to receive the locking element and restrict the movement of the second portion; and
      a rotatable lever attached to the second portion, wherein the lever includes a handle portion and a locking portion, wherein the locking portion selectively rotates into and out of one of a selected detents, whereby the second portion is restricted from movement;
   one or more rollers operative to support and facilitate the movement of the second portion of the platform in translational movement relative to the first portion between the first and second positions; and
   one or more tracks extending substantially the length of the pallet and corresponding to the one or more rollers, the one or more tracks operative to guide the second portion of the platform between the first and second positions.

2. The apparatus according to claim 1, wherein the locking element is further operative as a handle by which the second portion is movable.

3. The apparatus according to claim 1, further comprising a stop operative to block said at least one fork pocket of the pallet when the locking element is in the unlocked position.

4. A method of unloading articles on a loaded pallet, the method comprising:
   providing an apparatus as claimed in claim 1;
   arranging the loaded pallet with the second portion of the platform in the first position;
   unloading articles from the first portion of the platform;
   shifting the second portion of the platform translationally to the second position; and
   unloading articles from the second portion of the platform.

5. The method according to claim 4, further comprising arranging the platform with the second portion of the platform being closer to a side of the platform from which articles are loaded in the second position than in the first position.

6. The method according to claim 4, further comprising:
   moving the locking element from a locked position to an unlocked position before shifting the second portion of the platform; and
   moving the locking element from the unlocked position to the locked position before unloading articles from the second portion of the platform.

7. The method according to claim 6, wherein the locking element is further operative as a handle by which the second portion is movable, the method further comprising shifting the second portion of the platform by use of the locking element as a handle.

8. The method according to claim 6, further comprising blocking said at least one fork pocket of the pallet when the locking element is in the unlocked position.

9. A method of loading articles on a pallet, the method comprising:
   providing an apparatus as claimed in claim 1;
   arranging the pallet with the second portion of the platform in the second position;
   loading articles onto the second portion of the platform;
   shifting the second portion of the platform translationally to the first position; and
   loading articles onto the first portion of the platform.

10. The method according to claim 9, further comprising arranging the platform with the second portion of the platform being closer to a side of the platform from which articles are loaded in the second position than in the first position.

11. The method according to claim 9, further comprising:
   moving the locking element from a locked position to an unlocked position before shifting the second portion of the platform; and
   moving the locking element from the unlocked position to the locked position before loading articles onto the first portion of the platform.

12. The method according to claim 11, wherein the locking element is further operative as a handle by which the second portion is movable, the method further comprising shifting the second portion of the platform by use of the locking element as a handle.

13. The method according to claim 11, further comprising blocking said at least one fork pocket of the pallet when the locking element is in the unlocked position.

\* \* \* \* \*